United States Patent [19]

Frazer

[11] 4,320,290

[45] Mar. 16, 1982

[54] CONSTANT MAGNIFICATION OPTICAL TRACKING SYSTEM

[76] Inventor: Robert A. Frosch, Administrator of the National Aeronautics and Space Administration, with respect to an invention of Robert E. Frazer, LaCanada, Calif.

[21] Appl. No.: 145,282

[22] Filed: Apr. 30, 1980

[51] Int. Cl.$^3$ .............................................. H01J 3/14
[52] U.S. Cl. .................................... 250/216; 250/235
[58] Field of Search ...................... 250/216, 234, 235; 352/39

*Primary Examiner*—David C. Nelms
*Assistant Examiner*—Darwin R. Hostetter
*Attorney, Agent, or Firm*—Paul F. McCaul; John R. Manning

[57] ABSTRACT

A constant magnification optical tracking system for continuously tracking a moving object. More particularly, a constant magnification optical tracking system is disclosed wherein a traveling objective lens (14) maintains a fixed relationship to an object (10) to be optically tracked. The objective lens (14) is chosen to provide a collimated light beam (32) oriented in the direction of travel of the moving object (10) A reflective surface (18) is attached to the traveling objective lens (14) for reflecting an image of the moving object (10) to the lens. The moving object (10) is maintained at the focal point of the traveling objective lens (14). In an exemplary embodiment, the object to be tracked is a free-falling object, and the traveling objective lens is mounted on a holding structure (16) slidably attached to a vertically-extending guiding member (38) so that the free-falling object (10) will be located at the focal point of the objective lens for at least a portion of its free-fall path. In the exemplary embodiment, a motor (44) and control means (54 and 56) is provided for maintaining the traveling objective lens (14) in a fixed relationship relative to the free-falling object (10), thereby keeping the free-falling object at the focal point and centered on the axis of the traveling objective lens throughout its entire free-fall path.

14 Claims, 4 Drawing Figures

CONSTANT MAGNIFICATION OPTICAL TRACKING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

TECHNICAL FIELD

The invention relates to optical tracking systems and methods, and more particularly to an optical tracking system wherein the object is tracked at a constant magnification.

BACKGROUND ART

There has long been a need for optically tracking a moving object, which could be a free-falling object, wherein the image is formed at a constant magnification during the tracking period. For example, glass-enclosed nuclear fuel pellets are created during a free-fall period in which glass is formed around a nuclear fuel. It is highly desirable to be able to obtain images of the formation process of a pellet at various points thoughout the free-fall path, or even preferably to obtain a continuous image of the pellet. In order to make real time interpretations more meaningful, and subsequent photographic analysis more accurate, it is desirable that the tracking system have a constant magnification at all points along the free-fall path of the pellet, thereby eliminating adjustment of the various photographic images to compensate for the distance that the pellet has fallen. Also, a constant magnification tracking system would allow motion pictures showing the formation of the pellet to be obtained without any magnification adjustments. The invention satisfies the above need by providing a system and method wherein a free-falling object can be observed with constant magnification throughout the free-fall period.

STATEMENT OF INVENTION

The invention provides a constant magnification optical tracking system and method for continuously tracking a moving object. Included is a traveling objective lens for providing a substantially collimated light beam substantially parallel to an average direction of travel of the moving object, the objective lens having a focal length substantially equal to the optical distance between the moving object and the traveling objective lens. In addition, a means is provided for causing the moving object to be substantially located at the focal point of the traveling objective lens for at least a portion of a path followed by the moving object, and a means is located in the collimated light beam for observing the moving object.

In an exemplary embodiment of the invention, the moving object is a free-falling object, and the means for causing the moving object to be substantially located at the focal point of the traveling objective lens includes a vertically oriented guiding member and a holding means for mounting the objective lens to the guiding member so that it will free-fall along a vertical path defined by the guiding member, thereby resulting in the moving object being at the focal point of the traveling objective lens for at least a portion of the path of the moving object. If it is desired to observe the free-falling object for a significant distance, the exemplary embodiment includes a motor means and a detection means whereby a shadow created by the moving object is maintained at a substantially fixed relationship with respect to the holding means so that the object will remain centered and at the focal point of the traveling lens. In the exemplary embodiment, the shadow is created by back-lighting behind the free-falling object. Two light sensitive diodes are connected to the holding means so that whenever a shadow created by the free-falling object falls on one of the light sensitive diodes, the motor is driven appropriately so as to equalize the amount of light between the two light-detecting diodes.

Although the invention is described in the exemplary embodiment in terms of a free-falling object, it is equally applicable to any type of constant magnification optical tracking system wherein physical contact between the moving object to be tracked and the tracking means is undesirable. Thus the guiding member could be horizontally oriented and the traveling object lens caused to track a horizontally-traveling object so long as the interface between the traveling objective lens and the monitoring means is a collimated light beam having substantially no convergence or divergence. Thus the collimated light beam provides an image interface which is unrelated to the distance between the traveling objective lens and the means located in the collimated light beam for observing the moving object.

BEST MODE FOR CARRYING OUT THE INVENTION

A detailed illustrative embodiment of the invention disclosed herein exemplifies the invention and is currently considered to be the best embodiment for such purposes. It is provided by way of illustration and not limitation of the invention. Various modifications thereof will occur to those skilled in the art, and such modifications are within the scope of the claims which define the present invention.

As previously explained, the exemplary embodiment utilizes a traveling objective lens which maintains a fixed relationship to a free-falling object which is to be optically tracked. The traveling objective lens and a reflective surface are attached to a holding structure which is slidably attached to a vertically-extending guiding member. The guiding member is located relative to the path of the free-falling object so that the object will be located at the focal point of the traveling objective lens so long as both fall at the same rate and maintain the same relative position with respect to each other. The image of the free-falling object is reflected by the reflective surface to the traveling objective lens which is vertically oriented so that it will provide a vertically oriented, collimated light beam. The collimated light beam is intersected or interrupted by a fixedly-mounted optical means which focuses the light beam in a camera. Thus so long as the free-falling object remains at the focal point of the traveling objective lens, the camera will see a constant magnification image of the free-falling object throughout the length of its fall even though the distance from the camera to the free-falling object is constantly increasing. This is effected because the light interface between the traveling objective lens and the camera is maintained via a collimated light beam whose optical characteristics are unaffected by its length. The exemplary embodiment also describes a control system for maintaining the holding mechanism in a fixed position relative to the free-falling object when the holding mechanism would tend to free-fall at a different rate.

Figure 1:
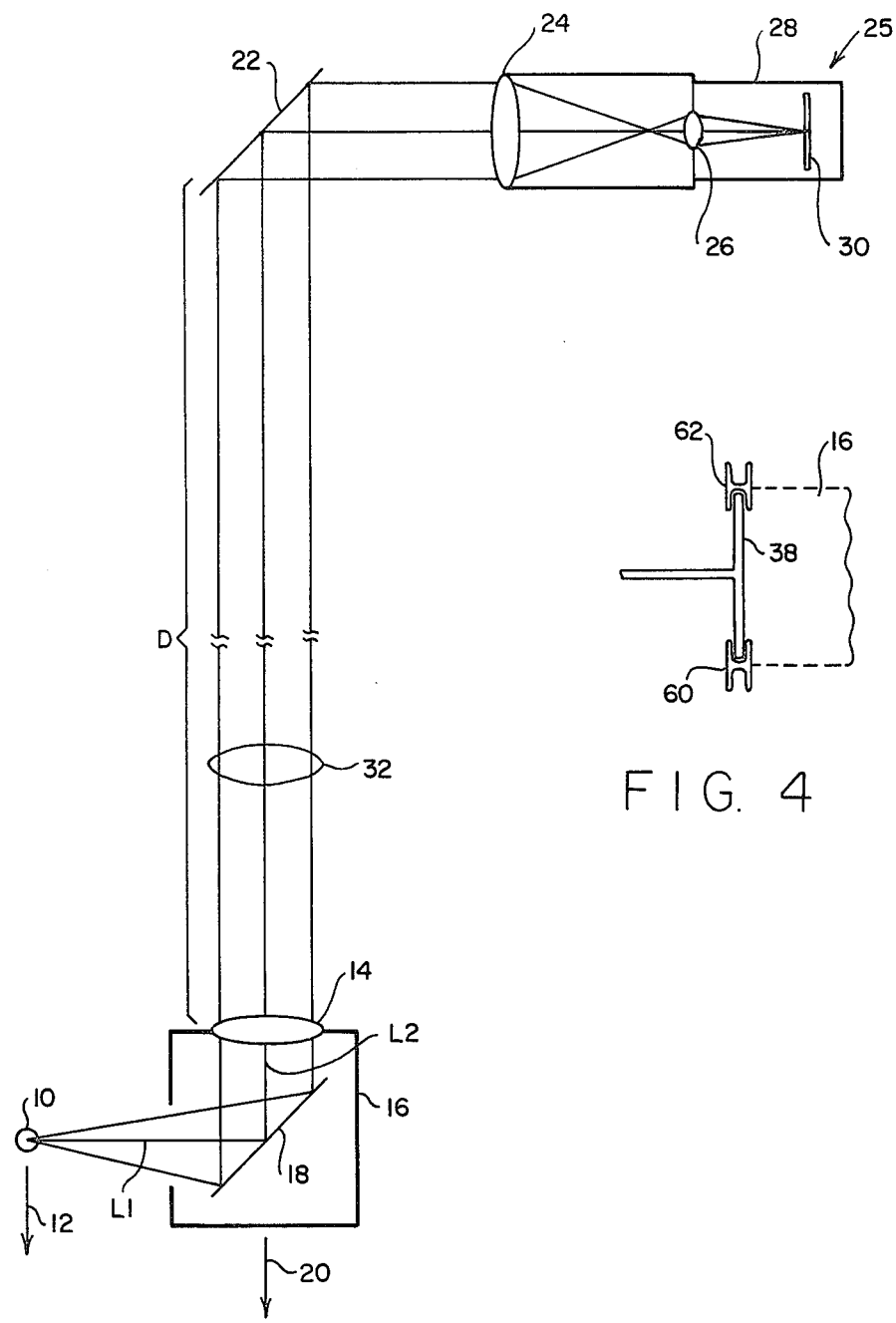
FIG. 1 is an optical ray trace diagram showing various optical elements of the exemplary embodiment.

Referring now to FIG. 1, a ray trace diagram of the optical paths created by an optical tracking system provided by the invention can be seen. A free-falling object 10 is shown, the object being subjected to a constant 1 g acceleration as shown by the vector 12. A traveling objective lens 14 is contained in a holding structure or carriage 16 in which a first reflective surface 18 is mounted. The first reflective surface 18 could be either a mirrored surface, a polished aluminum surface, or the like. The holding structure 16 is also subject to a 1 g acceleration as shown by the vector 20. A second reflective surface 22 is fixedly mounted and reflects incoming light to a fixedly mounted telescopic lens 24 and a camera 25 which includes a camera lens 26 contained within a camera housing 28. A photographic plate 30 is utilized for recording an image of the free-falling object 10. The camera 25 could be a high-speed motion picture camera. Alternatively, a video recording system could be utilized in lieu of the camera, or any other type of light recording or monitoring means could be utilized. Of course it should be understood that the traveling objective lens 14 could have been located between the first reflective surface 18 and the moving object 10 so that its image would have been collimated prior to being reflected upwardly by the reflective surface 18.

The traveling objective lens 14 has a focal length equal to L1+L2, the position of the free-falling object 10 always being a distance L1 plus L2 from the traveling objective lens 14. If the two downwardly extending vectors 12 and 20 are equal, and the holding structure 16 begins its free-fall at the same time as that of the object 10, the free-falling object 10 will remain at the traveling objective lens' focal point so long as any upwardly extending forces such as air-resistance forces are equal. Because the free-falling object 10 remains at the focal point of the traveling objective lens 14 as it falls, an upwardly extending light beam 32 from the traveling objective lens 14 is collimated, thus resulting in an image derived therefrom being unaffected by the distance D. The free-falling object 10 can therefore be viewed with the same magnification regardless of its physical location with respect to that of the camera lens 26. Of course as can be readily appreciated, if the holding structure 16 and the free-falling object 10 move through an atmospheric medium and have different drag coefficients, then some means for maintaining the position of the holding structure 16 relative to the free-falling object 10 will be required. A means for maintaining the same relative position will be explained in further detail below.

Figures 2, 3:
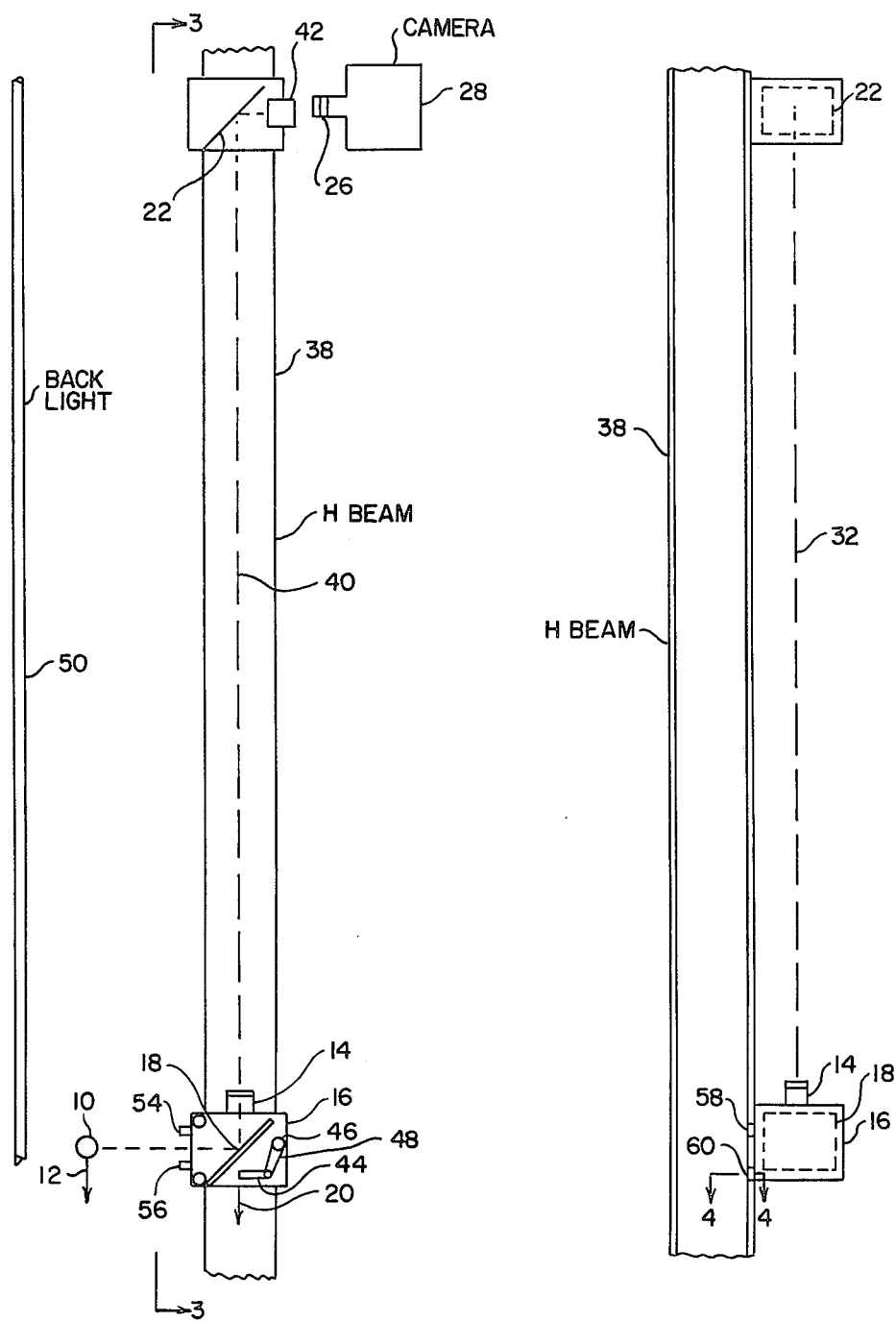
FIG. 2 is a side elevational view showing the apparatus of the exemplary embodiment and its relationship to a free-falling object.
FIG. 3 is a view taken along line 3—3 of FIG. 2.

A structure implementing the ray trace diagram shown in FIG. 1 can be seen in FIG. 2. Referring to FIG. 2, a vertically-oriented guiding member 38, which in the exemplary embodiment is an H-shaped beam, is oriented so that its longitudinal axis as shown by the dotted lines at 40 is substantially vertical and parallels a path followed by the free-falling object 10. As can be seen, the collimated light beam generated by the traveling objective lens 14 is interrupted by the second reflective surface 22 and reflected to a telescope lens 42 containing the telescope lens 24 shown in FIG. 1. Light from the telescopic lens 42 is directed into the camera lens 26. The second reflective surface 22 and associated telescopic lens 42 are fixedly attached to the guiding member 38.

In order to ensure that the free-falling object 10 remains in a fixed relationship with respect to the traveling objective lens 14, a motor 44 is provided, the motor driving a wheel 46 via a pulley 48. The wheel 46 is in frictional contact with the guiding member 38. A backlighting or light source 50, which could be a vertically-extending flourescent light, is positioned so that the free-falling object 10 is between the light source 50 and the guiding member 38 during the portion of its fall of interest. Thus, the free-falling object 10 casts a shadow of reduced light intensity on the holding structure 16. An upper light detecting diode 54 and a lower light detecting diode 56 are also provided. The upper and lower diodes 54 and 56 are in electrical communication with the motor 44.

In operation, when the free-falling object 10 is initially released, the holding structure 16 containing the traveling objective lens 14 is also released, thus causing a shadow created by the free-falling object 10 to be cast between the upper light detecting diode 54 and the lower detecting diode 56. However, as soon as one of the diodes 54 or 56 detects a drop in light intensity, its output signal, which is related to the light intensity detected, causes the motor 44 to change speed until both diodes 54 and 56 again experience the same light intensity or irradiation. For example, assume that the holding structure is falling at a velocity less than that of the free-falling object 10. Here, the lower light detecting diode 56 will soon be within the shadow cast by the free-falling object 10. The motor 44 is chosen so that a reduced signal from the lower light detecting diode 56 with respect to that from the upper light detecting diode 54 will cause an increase in speed, thereby resulting in the wheel 46 rotating faster and increasing the speed of the holding structure 16 relative to that of the free-falling object 10. The holding structure 16 speed will continue to increase until the shadow cast by the free-falling object 10 is again between the upper light detecting diode 54 and the lower light detecting diode 56. Although a continuous light source 50 has been shown, other techniques for backlighting the free-falling object 10 could be utilized. For example, an arm extending outwardly from the holding structure 16 and around the free-falling object 10 could be provided so that a continuous light source would be provided directly behind the free-falling object 10. As the free-falling object 10 moves relative to this light source, the upper and lower diodes 54 and 56 would operate in the same way so as to tend to maintain the free-falling object 10 directly in front of the light source. Also, it should be appreciated that many other types of guiding members could be utilized, it being desirable, however, that they be of a type which minimize friction between the holding structure and the guiding member as the holding structure is guided downwardly by the guiding member.

Referring now to FIG. 3, the H-shaped guiding member 38 can be seen as viewed from the free-falling object 10. The holding structure has wheels 58 and 60 which rotate along one side of the H-shaped guiding member 38 and provides support to the holding structure 16. Of course wheels (not shown) are provided on the other side of the holding structure 16. For tracking objects having a free-fall path of less than six feet, the interface between the wheels 58 and 60 and the guiding member 38 can be chosen to be sufficiently frictionless so that the holding structure 16 will keep up with the free-falling object 10 and the motor 44 shown in FIG. 2 will not be required.

Figure 4:
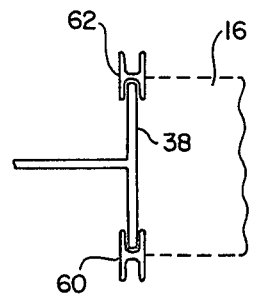
FIG. 4 is a cross-sectional view taken along line 4—4 of FIG. 3.

A cross sectional view taken along line 4—4 of FIG. 3 is shown in FIG. 4. Here the forward wheel 60 and a rearward wheel 62 are shown. As can be seen, these wheels fit over one side of the H-shaped guiding member 38 and provide support for the holding structure 16. Although not shown, the driving wheel fits directly above the rearward wheel 62 and can control the downward velocity of the holding structure 16.

Although the exemplary embodiment is described in conjunction with an object in a free-falling environment, such a configuration is not necessary to practice the teachings of the invention. More particularly, the collimated light beam could have any orientation, just so long as it is substantially parallel to the path of the object to be tracked. For example, the effects of high acceleration on an object could be recorded utilizing the system provided by the present invention. The guiding member could be horizontally oriented and the object being tracked subjected to high horizontal accelerations. Utilizing such a configuration, the object being tracked could emit a laser light beam which would be utilized by light detection diodes to maintain the object at the focal point of the traveling objective lens as previously explained.

Thus it should now be apparent that a constant magnification optical tracking system has been described wherein a holding structure containing a traveling objective lens follows an object to be tracked so that the object is always at the focal point of the lens. The lens provides a collimated light beam substantially parallel to the path of the moving object, the collimated light beam being intercepted by a fixed reflective and focusing means and provided to a recording means or viewing means so that the object can be monitored at a constant magnification regardless of the distance of the object from the recording or viewing means.

What is claimed is:

1. A constant magnification optical tracking system for continuously tracking a moving object, said system comprising:
   a traveling objective lens for providing a substantially collimated light beam substantially parallel to an average direction of travel of said moving object, said objective lens having a focal length substantially equal to the optical distance between said moving object and said traveling objective lens;
   first means for causing said moving object to be substantially located at the focal point of said traveling objective lens for at least a portion of a path followed by said moving object; and
   second means located in said collimated light beam for observing said moving object.

2. The system of claim 2 wherein said moving object is a free-falling object, said first means comprising:
   a vertically-oriented guiding member; and
   holding means for mounting said traveling objective lens to said guiding member so that it will free-fall along a vertical path defined by said guiding member, thereby resulting in said moving object being at the focal point of said traveling objective lens for at least a portion of the path followed by said free-falling object.

3. The system of claim 2 wherein said first means further comprises:
   driving means connected to said traveling objective lens and in mechanical communication with said guiding member;
   means for controlling said driving means so that said free-falling object will remain substantially at the focal point of said traveling objective lens.

4. The system of claim 3 wherein said means for controlling comprises:
   an upper shadow detection means connected to said holding means;
   a lower shadow detection means connected to said holding means;
   a light source oriented so that said free-falling object casts a shadow towards said holding means; and
   means responsive to said upper and lower shadow detection means for controlling said driving means so that said free-falling object's shadow tends to lie between said upper and lower shadow detection means as said free-falling object falls.

5. The system of claim 4 wherein said traveling objective lens is vertically oriented, said system further comprising a first reflective surface attached to said holding means and oriented at an angle of 45 degrees with respect to the vertical for reflecting an image of said free-falling object to said traveling objective lens.

6. The system of claim 5 wherein said second means comprises:
   a second reflective surface located in said collimated light beam and oriented at a predetermined angle; and
   a recording means located in a light beam reflected by said second reflective surface.

7. The system of claim 6 wherein said recording means comprises a camera.

8. A constant magnification optical tracking system for viewing a moving object, said system comprising:
   a traveling objective lens;
   first means for maintaining said moving object at the focal point of said traveling objective lens;
   second means for orienting said traveling objective lens so that a substantially collimated light beam parallel to the direction of travel of said moving object is generated; and
   third means for generating an image of said moving object from said collimated light beam.

9. The system of claim 8 wherein said moving object is free-falling, said first means comprising:
   a vertically-oriented guidance structure having a longitudinal axis substantially parallel to the path of said free-falling object; and
   holding means for attaching said traveling objective lens to said guidance structure so that said moving object and said traveling objective lens can free-fall in a substantially fixed relationship with respect to each other.

10. The system of claim 9 wherein said first means further comprises:

a motor mounted in a fixed relationship with respect to said traveling objective lens and in a frictional relationship to said guidance structure; and means for controlling said motor so that said free-falling object is maintained at substantially the focal point of said traveling objective lens.

11. The system of claim 10 wherein said means for controlling comprises:

means for back-lighting said free-falling object, thereby resulting in a shadow of said free-falling object being cast towards said holding means; and light detecting means attached to said holding means for controlling said motor so as to maintain said moving object shadow in a fixed relationship with respect to said light detecting means.

12. The system of claim 11 wherein said light detecting means comprises an upper light-detecting diode and a lower light-detecting diode.

13. A method of optically tracking a falling object at a constant magnification, said method comprising the steps of:

mounting a traveling objective lens on a vertically-oriented guidance structure so that said falling object will be located at substantially the focal point of said traveling objective lens as both lens and object fall;

providing a vertically-oriented collimated light beam generated by said traveling objective lens, said collimated light beam containing an image of said falling object; and interrupting said collimated light beam with a fixedly-located light monitoring means, thereby providing an image of constant magnification of said falling object.

14. The method of claim 13 further comprising the step of maintaining said falling object at the focal point of said traveling objective lens as said object falls.

* * * * *